United States Patent [19]
Bassetti

[11] Patent Number: 5,790,083
[45] Date of Patent: Aug. 4, 1998

[54] PROGRAMMABLE BURST OF LINE-CLOCK PULSES DURING VERTICAL RETRACE TO REDUCE FLICKER AND CHARGE BUILD-UP ON PASSIVE LCD DISPLAY PANELS DURING SIMULTANEOUS LCD AND CRT DISPLAY

[75] Inventor: Chester F. Bassetti, Pleasanton, Calif.

[73] Assignee: NeoMagic Corp., Santa Clara, Calif.

[21] Appl. No.: 629,803

[22] Filed: Apr. 10, 1996

[51] Int. Cl.$^6$ ................................................. G09G 5/00
[52] U.S. Cl. ........................... 345/3; 345/58; 345/93
[58] Field of Search ..................... 345/3, 103, 93, 345/58; 348/506; 395/750.04

[56] References Cited

U.S. PATENT DOCUMENTS

| | | | |
|---|---|---|---|
| 5,025,310 | 6/1991 | Sekiya et al. | 348/506 |
| 5,179,692 | 1/1993 | Inoue | 395/500 |
| 5,227,882 | 7/1993 | Kato | 358/160 |
| 5,280,279 | 1/1994 | Nakazawa et al. | 345/38 |
| 5,307,084 | 4/1994 | Yamaguchi et al. | 345/58 |
| 5,386,217 | 1/1995 | Liu et al. | 345/99 |
| 5,444,457 | 8/1995 | Hotto | 345/94 |
| 5,448,260 | 9/1995 | Zenda et al. | 345/100 |
| 5,459,479 | 10/1995 | Cummings | 345/50 |
| 5,459,495 | 10/1995 | Scheffer et al. | 345/147 |
| 5,508,714 | 4/1996 | Zenda | 345/3 |
| 5,579,025 | 11/1996 | Itoh | 345/3 |
| 5,598,178 | 1/1997 | Kawamori | 345/93 |
| 5,615,376 | 3/1997 | Ranganathan | 395/750.04 |
| 5,699,076 | 12/1997 | Tomiyasu | 345/103 |

*Primary Examiner*—Richard A. Hjerpe
*Assistant Examiner*—Francis N. Nguyen
*Attorney, Agent, or Firm*—Stuart T. Auvinen

[57] ABSTRACT

A graphics controller drives a flat-panel display and simultaneously drives an external cathode-ray-tube (CRT) display. Horizontal clock pulses continue to be applied to the flat panel during the CRT's vertical blanking or re-trace period so that the flat panel is not left in a constant state during the entire re-trace period. Leaving the flat panel in a constant state for a long period of time can cause flicker or delayed response immediately after the re-trace period ends. Running the horizontal clocks during the re-trace period can lead to D.C. buildup or rolling flicker, believed to be caused by a polarity-inversion counter in the panel assembly which is not designed to receive additional horizontal clocks beyond the number of lines on the flat panel. D.C. buildup in the flat panel is reduced by adding a high-frequency burst of horizontal clock pulses to the flat panel during the CRT's vertical re-trace period. The burst of clock pulses adjusts the count in the polarity-inversion counter. The number of pulses in the burst is programmable so that the optimum number of pulses in the burst can be determined empirically and adjusted for different panel manufacturers.

19 Claims, 9 Drawing Sheets

PRIOR ART

PROGRAMMABLE BURST OF LINE-CLOCK PULSES DURING VERTICAL RETRACE TO REDUCE FLICKER AND CHARGE BUILD-UP ON PASSIVE LCD DISPLAY PANELS DURING SIMULTANEOUS LCD AND CRT DISPLAY

BACKGROUND OF THE INVENTION

1. Field of the Invention

This invention relates to graphics controllers, and more particularly for reducing DC buildup on an LCD flat-panel display by altering the horizontal clock from the graphics controller to the LCD flat-panel display.

2. Description of the Related Art

New display technologies are one of the key advancements which allow small, portable laptop, notebook, and hand-held personal computers (PC's) to be built. These portable PC's use flat-panel displays of liquid-crystal-display (LCD) or active-matrix technologies. A popular class of these flat-panel displays, called super-twist nematic (STN) panels require that the voltage polarity to the picture elements or pixels in the panel be periodically reversed. If the applied voltage is not periodically reversed, then charge builds up within the panel and damage results.

Since it would be very difficult for a PC manufacturer to design and build the interface logic to the display panel, panel manufacturers provide support circuitry along with the display panel itself. Thus the PC manufacturer does not have to be concerned with inverting the voltages to the panel, since the panel assembly itself generates and inverts the voltages which drive the picture elements. Since voltages of 25 to 30 volts are needed to drive these picture elements, these high voltages are often generated within the panel assembly.

A variety of techniques have been employed by different panel manufacturers for generating and inverting the high panel voltages. See for example U.S. Pat. No. 5,280,279 by Nakazawa et al. and assigned to Sharp, which discloses a polarity-inverting circuit. U.S. Pat. No. 5,459,495 by Scheffer et al. assigned to In Focus Systems, discloses adjusting gray levels by calculating the amplitude and polarity of the voltages applied to the column electrodes of the panel.

Panel manufacturers commonly use a small counter to invert the voltage after every 13, 17, or 29 horizontal lines are displayed. These counters are not reset at the beginning of each new screen, but are free-running. A prime-number modulus is used to ensure that each individual line receives equal amounts of time of positive and negative voltages, when averages over a large number of screen refreshes. Panel manufactures ensure that their panels operate correctly, without D.C. buildup, for common resolutions such as 800×600 SVGA having 600 lines. More complex schemes and calculations which alter the polarity can be approximated as a counter for purposes of this invention.

Simultaneous Display on Flat Panel and External CRT

Figure 1:
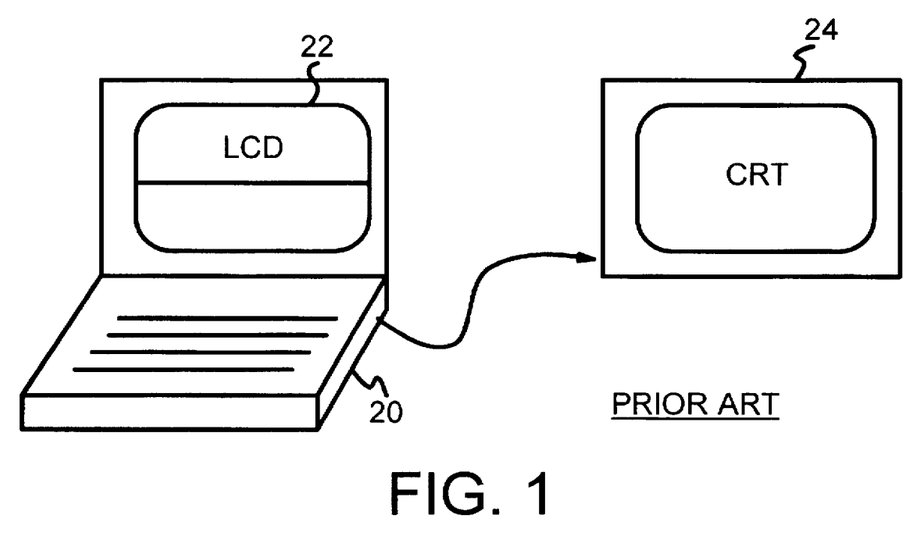
FIG. 1 shows laptop PC having a flat-panel LCD display being driven at the same time as external CRT is being driven.

Often these portable PC's have a connection for a cable to a cathode-ray tube (CRT) so that the portable PC can also drive a CRT display. Often both the CRT display and the flat panel display on the portable PC are simultaneously driven. This simultaneous display required that the pixels are driven from the PC's graphics controller to both the CRT and the flat panel at the same time. See U.S. Pat. No. 5,448,260 by Zenda et al. assigned to Toshiba, which simultaneously drives both an LCD panel and a CRT. FIG. 1 shows laptop PC 20 having a flat-panel LCD display 22 being driven at the same time as external CRT 24 is being driven. The displayed image is viewed on both LCD display 22 and external CRT 24.

Display Built Up from Lines of Pixels

Figure 2:
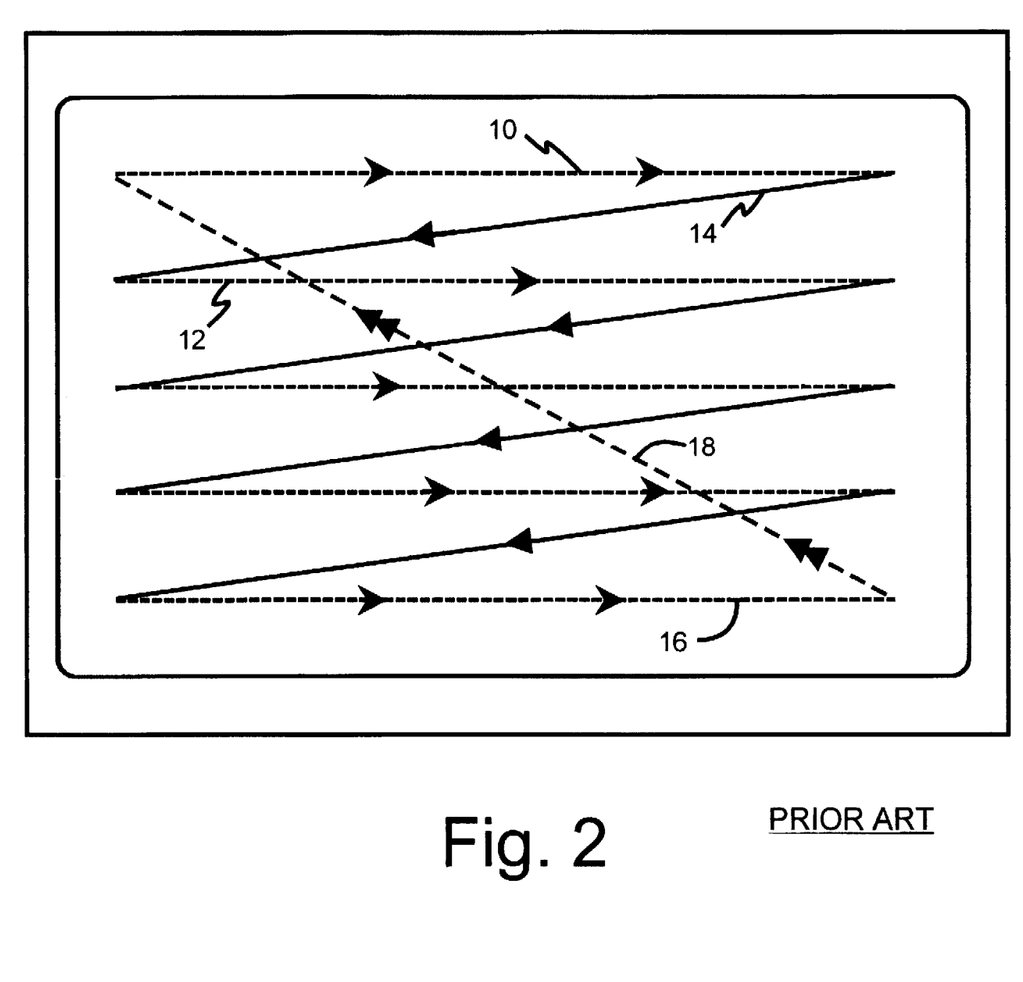
FIG. 2 is a diagram of a display, which could be a cathode-ray-tube (CRT) video display, or a flat-panel liquid-crystal display (LCD) or other type of display.

FIG. 2 is a diagram of a display, which could be a cathode-ray-tube (CRT) video display, or a flat-panel liquid-crystal display (LCD) or other type of display. An image is formed on the display screen by selectively energizing or illuminating small dots or pixels on the screen which are the smallest picture elements. In a CRT, a pixel is energized by an electron gun that directs a beam of energizing electrons to a particular point on the screen. The electron beam is scanned from left to right in a horizontal line and pulsed to illuminate some points on the line but not others. The screen is divided into a number of horizontal lines 10, 12, 16, with each line comprising a number of pixels. The pixels in a line are illuminated by a CRT one-by-one from the left side to the right side of a horizontal lines 10, 12, 16.

Once the entire horizontal line 10, 12, 16 has been scanned, the electron beam is disabled or "blanked" so that no pixels are energized and the electron beam is re-traced back to the beginning on the next horizontal line 12. This horizontal re-trace 14 follows a diagonal path. After re-trace, the blanking is ended and the next horizontal line 12 is scanned. The process of scanning a horizontal line and re-tracing is repeated until all lines are scanned. Once scanning of the last horizontal line 16 is complete, the electron beam is returned to the beginning of the first line 10 by a vertical re-trace 18. The electron beam is again blanked to prevent any illumination while the electron beam is being retraced to the top of the screen.

Flat-Panel Displays Do Not Require Re-Trace Period

Other display technologies also divide a screen into horizontal lines comprised of pixels that are either illuminated or not. A horizontal recovery or blanking period between horizontal lines and a vertical recovery or blanking period to return to the top of the screen may also be necessary with these display technologies, even though an electron beam is not used. However, for flat-panels displays, this recovery time to begin a new line or new screen is much smaller than the blanking period for a CRT. CRT's require a large blanking time because the electron beam must be physically moved or retraced to another place on the screen. Flat-panels do not use an electron beam and thus require no retrace period.

30 Additional Horizontal Pulses During CRT Vertical Re-Trace Period

Figure 3:
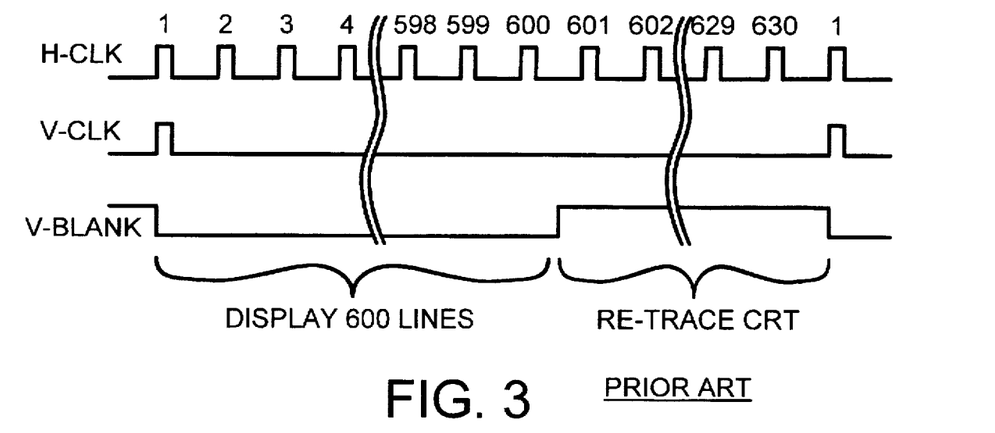
FIG. 3 shows that horizontal synch or clock pulses continue during the vertical retrace period of a CRT.

FIG. 3 shows that horizontal synch or clock pulses continue during the vertical retrace period of a CRT. A horizontal line clock H-CLK is the horizontal synch signal to a CRT, or a close derivative. H-CLK is pulsed once for each horizontal line displayed. After all 600 horizontal lines are displayed, the vertical blanking signal V-BLANK, is asserted to prevent pixels from being displayed while the electron beam is re-traced to the beginning of the first line. After re-trace is complete, the vertical clock V-CLK is asserted to begin display of the next frame or screen with the first line.

The horizontal line clock continues to pulse during the vertical blanking period, even though no lines are displayed. This keeps the CRT in horizontal synch during the vertical re-trace period. For a typical 600-line display, an additional 28–30 H-CLK pulses occur during the vertical blanking period. Thus 630 pulses of H-CLK occur for the CRT display.

Figure 4:
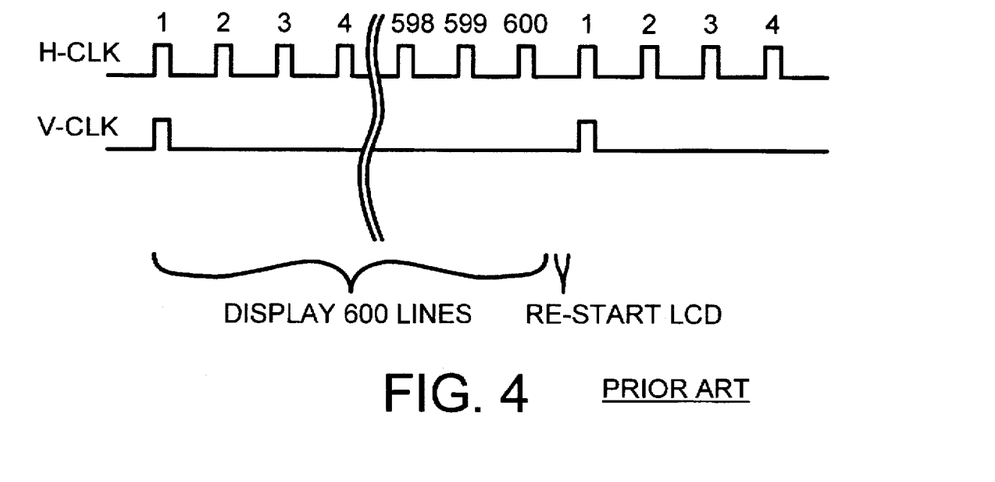
FIG. 4 shows that flat-panels do not require a long vertical re-trace period.

FIG. 4 shows that flat-panels do not require a long vertical re-trace period. The horizontal line clock H-CLK is pulsed for each of the 600 lines of display. The vertical clock V-CLK can be pulsed immediately after all 600 lines have been written to the display panel, since no re-trace period is needed as no electron beam is used by the flat-panel. A recovery period after all 600 lines have been written is required to restart some of the support circuitry in the flat-panel assembly, but this period is short, perhaps less than one period of the horizontal line clock. Recovery periods vary for different panel manufactures but can approach zero.

Simultaneous CRT & LCD Scan Pauses LCD During Vertical Re-Trace

Figure 5:
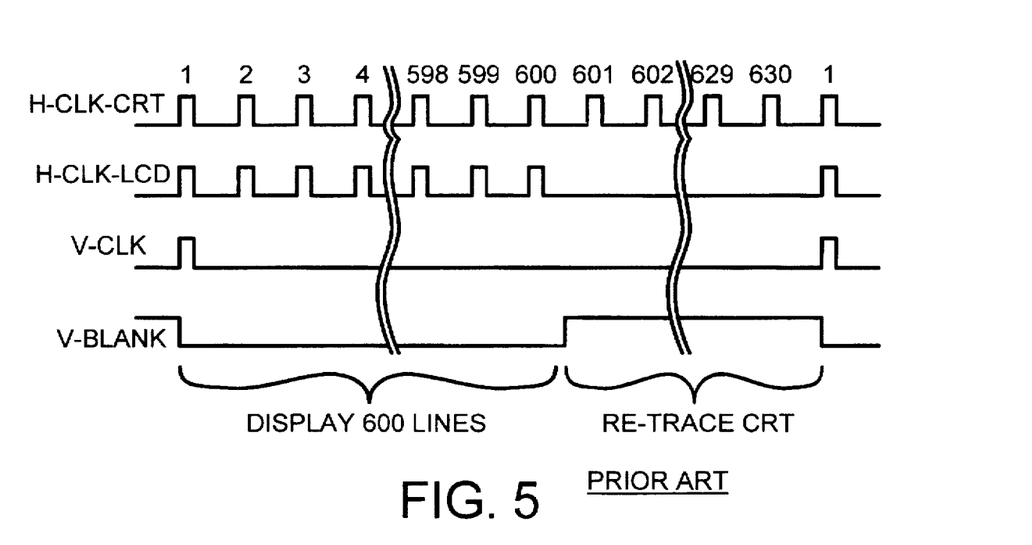
FIG. 5 shows that when both a CRT and a flat panel are simultaneously driven by a PC, then the horizontal line pulses to the LCD are often suppressed during the vertical re-trace period.

When both a CRT and a flat panel are displayed simultaneously, the worst-case display timing must be used. Since the LCD is more flexible in timing than the CRT, the CRT's timing is used. The CRT must be provided with the vertical re-trace period or the CRT will not function. The flat panel will simply pause during the re-trace period. FIG. 5 shows that when both a CRT and a flat panel are simultaneously driven by a PC, then the horizontal line pulses to the LCD are often suppressed during the vertical re-trace period. However, the CRT needs the horizontal line clocks during the vertical re-trace period. Suppressing the horizontal pulses during the re-trace period causes the flat-panel to remain in a paused state.

D.C. Build-Up Problem

Pausing the flat panel for about 30 horizontal clock periods can cause visible distortions on the flat-panel display. The flat panel continues to drive the last line voltage displayed during the entire vertical re-trace period. Thus the entire display is driven with a constant voltage for a long period of time. This can cause direct-current (DC) buildup. The DC buildup causes a chemical breakdown of the LCD fluid, resulting in reduced display life, reduced screen contrast, bands, or other problems. Since the voltage is effectively over-driven for a long time, there may be an extended recovery time when the next frame begins to be displayed after the vertical re-trace period ends. This can appear as a lingering glow or flicker.

The horizontal clocks may continue to be applied to the flat panel during the vertical re-trace period, since most flat panels do not advance the line displayed past the last line on the display when too many horizontal clocks are applied in a frame. DC buildup can still occur when the total number of horizontal line clocks is an exact even integer multiple of the period that the voltage is inverted. For example, when the voltage is inverted every 17 horizontal line clocks, then when the vertical re-trace period is 29 line clocks long, a total of 629 line clocks are applied. Since 629 is an even integer multiple of 17 (17 * 37=629), DC buildup occurs as the same lines are always driven with either a positive or a negative voltage. Lines 1–17 are always driven with a positive voltage, lines 18–34 are always driven with a negative voltage . . . lines 613–629 are always driven with a negative voltage, etc. The voltage-inverting counter always switches back to the positive voltage at the end of line 629 and the beginning of line 1.

Figure 6:
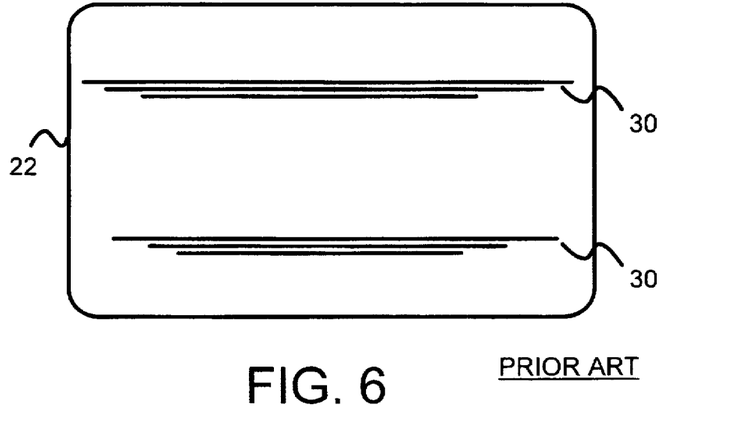
FIG. 6 shows DC buildup bands on flat-panel LCD display.

This DC buildup appears as dark or bright bands on the display. FIG. 6 shows DC buildup bands 30 on flat-panel LCD display 22. These bands 30 are stationary when DC buildup is caused by the total number of line clocks being an exact even integer multiple of the voltage-inverting count, but otherwise these bands 30 appear as noise on the display, rolling across to other lines on the screen, or momentarily appearing as flicker and then disappearing.

The display manufacturer often optimizes the display assembly for receiving the exact number of line clocks are there are horizontal lines on the screen. Thus a super-VGA flat-panel display is optimized to receive exactly 600 lines clocks for a single-scan display, or 300 line clocks for a dual-scan display. Continuing to pulse the line clocks during the CRT's vertical re-trace period adds more line clocks to the total, and this can cause either rolling or stationary bands on the screen. Blocking these additional line clock pulses to the flat-panel can also cause bands to appear.

What is desired is a graphics controller for a portable computer which can simultaneously drive pixels to both a flat-panel display and an external CRT display. It is desired to reduce or eliminate flicker, ripple, stationary and rolling bands, and other kinds of noise on the flat-panel display that occur during simultaneous display with the external CRT. It is further desired to provide an adaptable solution that successfully reduces noise on a wide variety of flat-panel displays from different manufacturers of flat-panel display assemblies.

SUMMARY OF THE INVENTION

A graphics controller drives a stream of pixels that represent a frame of an image. The stream of pixels is simultaneously driven to a flat-panel display and to a cathode-ray tube (CRT). The graphics controller has a line clock means which generates a free-running horizontal clock having a frequency equal to a horizontal synch frequency applied to the CRT for synchronizing horizontal lines of pixels. Vertical re-trace means is triggered after all horizontal lines of pixels are driven to the flat-panel display. It generates a vertical re-trace signal to the CRT to prevent pixels from being visibly displayed on the CRT during a re-trace period.

Burst means is triggered during the re-trace period. It generates a burst of pulses. Merge means is coupled to the burst means and is coupled to the free-running horizontal clock. It applies the free-running horizontal clock to a line-clock input on the flat-panel display and also applies the burst of pulses to the line-clock input on the flat-panel display. Thus the burst of pulses is applied to the line-clock input of the flat-panel display during the re-trace period of the CRT.

Further aspects of the invention include programmable means which is coupled to the burst means. It adjusts a number of pulses in the burst of pulses in response to programming by a user. Thus the number of pulses in the burst of pulses applied to the line-clock input of the flat-panel display is programmable.

In still further aspects the burst of pulses have a frequency greater than the horizontal synch frequency, and the number of pulses is less than 30. A pixel clock means generates a pixel clock. One pixel is transferred to the CRT and transferred to the flat-panel display during each pixel-clock period of the pixel clock when the vertical retrace signal is not active. The line clock means receives the pixel clock and generates a pulse of the free-running horizontal clock after every x pixel-clock periods, where x is a number of pixels in a horizontal line for a current resolution is displayed. Thus the free-running horizontal clock is generated from the pixel clock.

In other aspects a trigger means begins the burst of pulses during the re-trace period in response to a pulse of the free-running horizontal clock during the re-trace period. A burst counter receives the pixel clock and counts a number of pulses generated.

Terminating means ends the burst of pulses after a the number of pulses generated equals a programmed number of pulses.

Other aspects of the invention include programmable-spacing means which is coupled to the pixel clock. It determines a number of pixel-clock periods between pulses in the burst of pulses. The number of pixel-clock periods is programmed by a user. Thus the burst of pulses is generated with a period programmed by the user.

In further aspects of the invention a panel assembly contains a polarity-inverting counter which inverts a polarity of voltages applied to a matrix of picture elements in the panel assembly. The polarity-inverting counter inverts the polarity after every m pulses of the line-clock input. The burst of pulses applied to the line-clock input advances the polarity-inverts counter. D.C. buildup in the matrix is reduced by the burst of pulses which advance the polarity-inverting counter before a next frame is displayed.

DETAILED DESCRIPTION

The present invention relates to an improvement in graphics controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Flat-Panel Assembly Periodically Inverts Polarity

Figure 7:
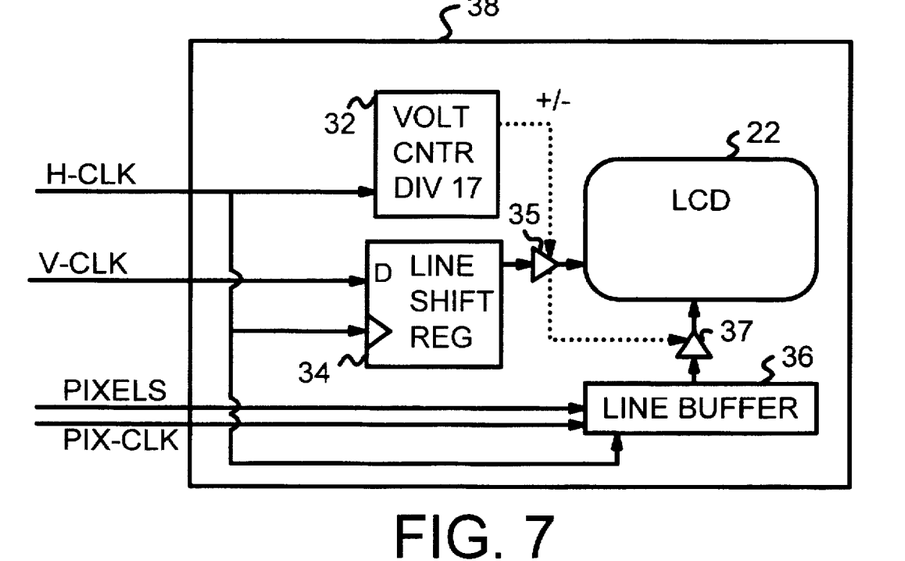
FIG. 7 is a typical flat-panel assembly.

FIG. 7 is a typical flat-panel assembly. Assembly 38 includes a flat-panel LCD display 22, which contains rows and columns of inputs to activate picture elements at the intersections of the rows and columns in the panel matrix. Row driver 35 and column driver 37 drive voltages to the row and column inputs of LCD display 22. Drivers 35, 37 both drive positive voltages when volt counter 32 indicates that positive voltages be driven, but negative voltages when volt counter 32 indicates that negative voltages be driven.

Figure 8:
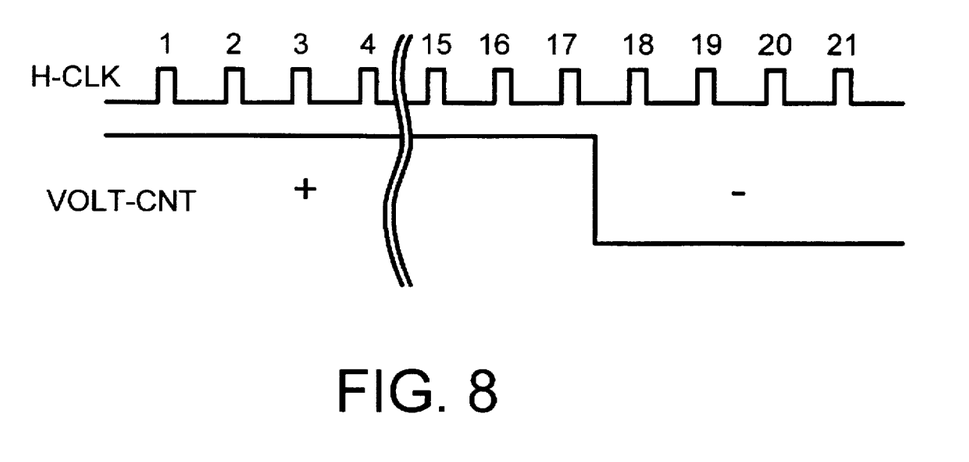
FIG. 8 highlights that the voltage is inverted after every 17 line clocks.

Volt counter 32 receives the horizontal line clock H-CLK from a graphics controller in a personal computer (PC), and changes polarity after a predetermined number of line clocks are received. In the examples of FIGS. 7 and 8, polarity is reversed after every 17 line clocks are received, which has been observed for some flat panels.

Line shift register 34 is a simple shift register which the vertical clock V-CLK is input as the data bit input from the graphics controller, and advanced to the next horizontal line or row by the horizontal line clock. After the last line is displayed, line shift register 34 activates the non-existent and non-displaying horizontal lines and does not loop back to the first line. Thus additional line clocks beyond the last line are ignored. Line buffer 36 receives pixel data from the graphics controller which are synchronized to a pixel clock PIX-CLK. once an entire line of pixels have been received by line buffer 36, the line of pixels are latched and driven to the column inputs of LCD display 22 by the horizontal line clock H-CLK. Thus pixels are actually displayed by LCD display 22 one horizontal period after being received, and LCD display 22 is one horizontal line behind the CRT's display when simultaneous display occurs.

FIG. 8 highlights that the voltage is inverted after every 17 line clocks. The row and column drivers 35, 37 of FIG. 7 drive positive voltages to LCD display 22 during the first 17 horizontal lines. Then the polarity is reversed by volt counter 32 and negative voltages are driven to LCD display 22 during the next 17 horizontal lines. Volt counter 32 is free-running and is not reset during the vertical re-trace period but continues to count as line clocks are received during the vertical re-trace period and into the next frame. Volt counter 32 may use common binary logic which then drives an analog mux which selects the correct analog voltage to be applied to the panel rows and columns.

In the examples of FIGS. 7 and 8, polarity is reversed after every 17 line clocks are received. Other values besides 17 line clocks are possible; 17 is just an example.

Pulses of Line Clocks Added

The inventor has realized that adding a burst of line clocks during the CRT's vertical re-trace period can be used to correctly synchronize the total number of line clocks in a refresh period to the volt counter which inverts the polarity. Certain values for the total number of line clocks have less display noise than others. Thus a total number of line clocks can be chosen which minimizes the DC buildup and noise problems on the flat panel.

Figure 9:
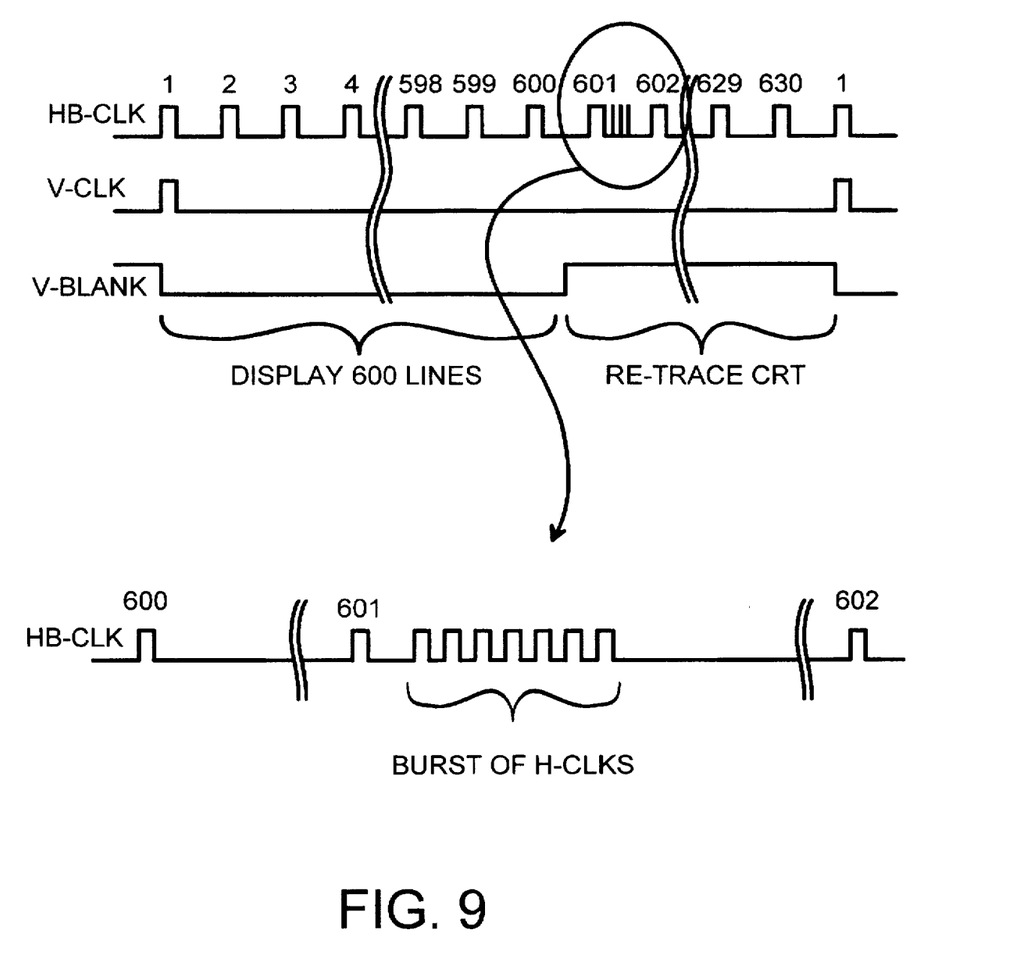
FIG. 9 shows a pulse of horizontal line clocks added during the CRT's vertical retrace period.

FIG. 9 shows a pulse of horizontal line clocks added during the CRT's vertical retrace period. For the 600-line super-VGA display, 600 horizontal lines are displayed by the CRT and also written to the flat-panel display. Thus 600 pulses of horizontal clock HB-CLK are required to display the 600 lines. Additional pulses of HB-CLK beyond 600 are ignored by the flat-panel display. A horizontal line clock without the additional burst of pulses is applied to the CRT, while HB-CLK with the burst of pulses is applied to the flat-panel display.

After pulse 601, which is the first line clock pulse completely within the vertical retrace period, the burst of pulses is added. These pulses occur at a higher frequency than the other pulses of the horizontal line clock, but the voltage counter is able to respond at this higher frequency. The horizontal frequency is normally only about 37 kHz, which is very slow compared to modern electronic circuits.

Generation of Burst of Pulses

Figure 10:
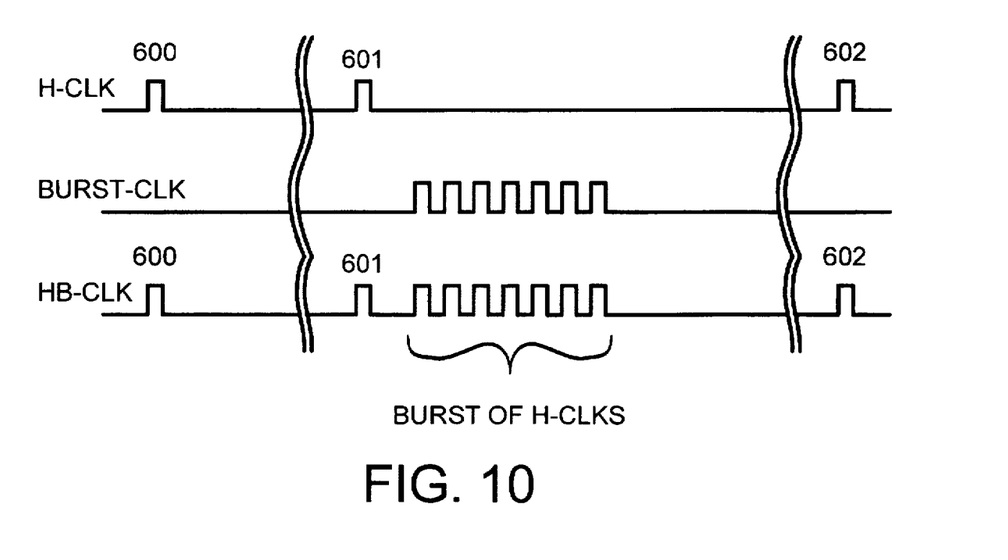
FIG. 10 shows that the new line clock HB-CLK to the flat panel with the burst of additional line-clock pulses can be generated from the normal horizontal line clock, and from a burst of pulses triggered by the 601st pulse of the line clock.

FIG. 10 shows that the new line clock HB-CLK to the flat panel with the burst of additional line-clock pulses can be generated from the normal horizontal line clock H-CLK, which runs at about 37 kHz, and from a burst of pulses BURST-CLK triggered by the 601st pulse of the line clock.

Figure 11:
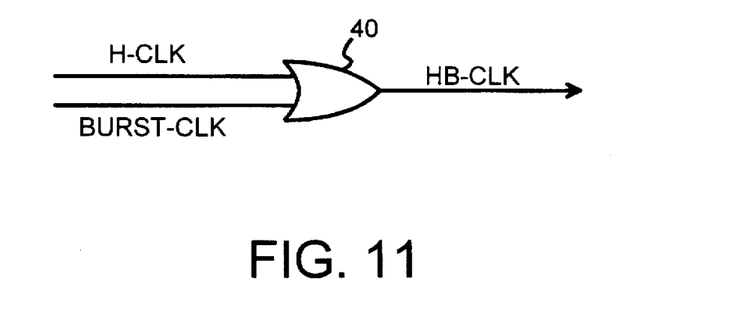
FIG. 11 shows that a simple OR gate may be used to generate the new line clock to the flat panel.

FIG. 11 shows that a simple OR gate may be used to generate the new line clock to the flat panel. OR gate 40 receives the standard, free-running horizontal line clock H-CLK, which is also sent to the CRT for horizontal synch. The burst of line clocks is generated as BURST-CLK and also input to OR gate 40. The OR of these two clocks, H-CLK and BURST-CLK, produces the new line clock to the flat panel, HB-CLK, which includes the burst of pulses during the CRT's vertical re-trace period.

Number of Pulses Added is Programmable

Since each manufacturer uses a different number of line clocks before polarity is reversed, adding a fixed number of line clocks during the vertical re-trace period has varying results. For some manufacturers the number of clocks added is correct, but for other manufacturer's panels the number added may result in flicker or other noise. Should the number of pulses added be an exact even multiple of the modulus for that manufacturer's volt counter, then DC build up is stationary and can even cause damage to the panel. Thus adding a fixed number of line clocks is not effective for any arbitrary panel.

The inventor has realized that no single number of pulses can be added that is effective for all manufacturers of flat-panel displays. Manufacturers use different moduli for inverting polarity and thus different numbers of pulses are required.

The number of pulses in the burst is programmable and is changed by writing the burst count to a programmable register on the graphics controller in the PC. A simple series of I/O instructions is used to write to the programmable register as is well-known in the art. The PC manufacturer can test different numbers of burst pulses by programming in different burst counts into the programmable register. This is normally done in the lab while the PC is being developed. The developer first programs in a burst count of zero, then observes any noise or flicker on the LCD display. The developer then increases the burst count to 1, and repeats the observations. The developer continues to write successively higher burst-count values to the programmable register and make observations until the maximum burst count is reached. The developer will notice that some values of the burst count are definitely better than other values at reducing display noise. The developer chooses one of the better burst-count values and uses this value for production machines that all use the same display assembly. Should the display assembly be replaced, the process can be repeated. The burst-count value is stored in the graphics controller's BIOS and programmed in when simultaneous CRT and LCD display mode is initiated.

Adding the burst of pulses is also useful for LCD-only mode. The duty cycle for the LCD should be minimized to increase the contrast ratio. Values for the total number of horizontal clock pulses that are closer to 600 are better than 630 because of the smaller duty cycle. Because a value of 601 or 602 may not provide the best number for a particular panel, many controllers increase the number of horizontal clocks to larger values to set the noise to an optimum level. Unfortunately, this reduces contrast ratio. Using the inventor's burst feature, the number of standard horizontal clocks can be set to 601, reducing the contrast ratio, and the burst of horizontal clock pulses is added to achieve the optimum noise level without sacrificing the contrast ratio.

Figure 12:
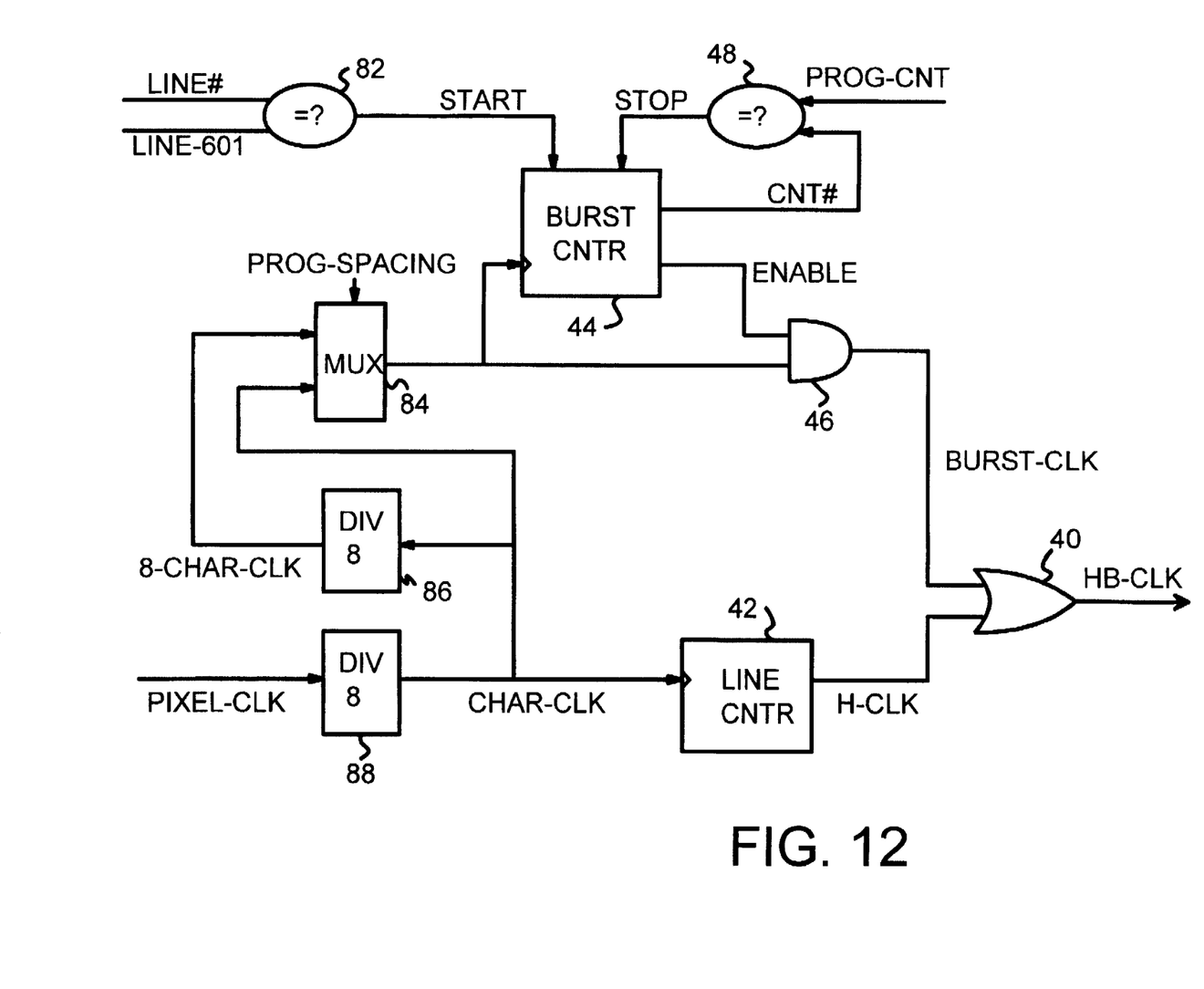
FIG. 12 is a diagram of a bursting line clock generator in a graphics controller.

Bursting Line Clock Generator—FIG. 12

FIG. 12 is a diagram of a bursting line clock generator in a graphics controller. A pixel-clock PIXEL-CLK is used by the graphics controller to clock pixels to the CRT and LCD displays. Divider 88 divides PIXEL-CLK by eight to generate a character clock CHAR-CLK. Line counter 42 is clocked by CHAR-CLK and outputs a single pulse of horizontal line clock H-CLK once all the pixels in the horizontal line have been transferred for display. H-CLK is sent directly to the CRT but is ORed with the burst of line-clock pulses BURST-CLK by OR gate 40 to generate the bursting line clock HB-CLK, which is sent to the flat-panel LCD display assembly. Typically the flat-panel display assembly is contained in the cover of a laptop or notebook computer while the graphics controller is contained in the base of the laptop near the CPU and DRAM memory.

The character clock CHAR-CLK is further divided by 8 by divider 86 to generate 8-CHAR-CLK, which has a period of 64 pixel-transfers. Mux 84 selects either the slower 8-CHAR-CLK or CHAR-CLK as the clock to burst counter 44. Mux 84 determines the period of the burst of line clocks in BURST-CLK. A programmable bit PROG-SPACING in the programmable register determines the period of these bursting pulses. When a large number of pulses is selected, then the closer spacing is selected so that all the pulses in the burst occur before the next regular pulse of the horizontal line clock H-CLK.

Comparator 82 signals START when the current line number is equal to the 601st line, which occurs during the CRT's vertical re-trace period. START triggers burst counter 44 to begin counting. ENABLE is activated once START is triggered, enabling AND gate 46 to pass any pulses through to BURST-CLK and HB-CLK to the flat panel display.

Each pulse of either character clock or 8-CHAR-CLK increments burst counter 44 and the burst count CNT#. Once the burst count CNT# is equal to the programmable burst count PROG-CNT, then comparator 48 signals STOP, which disables and resets burst counter 44. ENABLE is de-activated, blocking all further pulses from mux 84 at AND gate 46, thus ending the burst of pulses.

For super-VGA, each horizontal line contains 800 displayed pixels, or 100 characters. Horizontal retrace requires some additional non-displayed pixels beyond 800. When 8-CHAR-CLOCK is selected by mux 84, then up to 100/8 or 12 pulses may be in the burst of line clocks. When the undivided character clock CHAR-CLK is selected, then up to 100 pulses may be added in the burst. However, in practice a limit of 32 pulses appears adequate as a maximum value for the burst count PROG-CNT.

Dual-Scan Display Panels use Half as Many Line Clocks

Dual-scan flat-panel displays use a separate half-frame buffer to buffer half of the frame displayed. Dual-scan displays can achieve a higher refresh rate than the CRT, and two lines, one in each half of the LCD display, are activated at the same time to achieve this higher refresh rate. For dual-scan displays, 300 line clocks are used rather than 600 line clocks as was described earlier in the examples. Extra row latches and row drivers are used for the second half-panel.

LCD AND CRT CONTROLLER—FIG. 13

Figure 13:
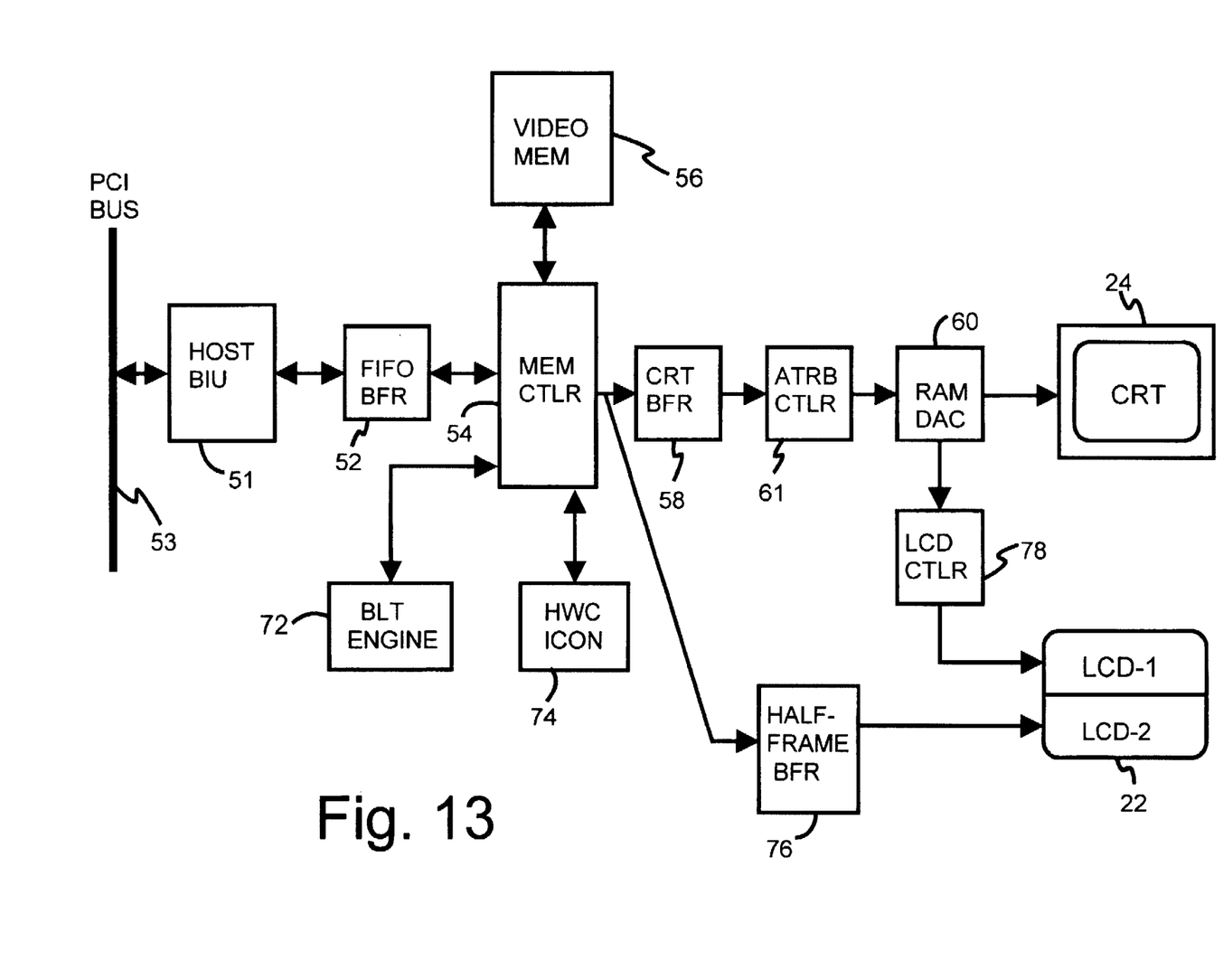
FIG. 13 shows a block diagram of a video sub-system driving a CRT and an LCD flat-panel display.

FIG. 13 shows a block diagram of a video sub-system driving a CRT and an LCD flat-panel display. FIG. 13 concentrates on the data paths which move pixels around within the video subsystem; horizontal and vertical clocks are also generated but not shown. A host bus such as a PCI bus 53 on the host transfers data to and from host buffer 52 with the aid of host bus-interface unit 51. PCI bus 53 is an industry-standard interface bus defined by a consortium of personal computer manufacturers. The PCI bus writes data to host buffer 52 in rapid "bursts".

A FIFO synchronous to the host bus clock, such as host buffer 52, is necessary for supporting higher clock frequencies such as 33 MHz. Long bursts from the host can be supported by providing larger Fifo's. However, the larger prior-art Fifo's can consume more power, even when data is not being transferred.

Memory controller 54 transfers host data to and from the host buffer 52. Video memory 56 may require periodic refreshing to prevent data loss from leakage in the dynamic memory chips in video memory 56. Block transfers and manipulation of the video data in video memory 56 may be accomplished by BLT engine 72. A hardware cursor and icon-drawing logic is provided by HWC logic 74. Memory controller 54 transfers video data to and from HWC logic 74 and video memory 56.

Memory controller 54 also writes pixel data from video memory 56 to CRT buffer 58 for refreshing external CRT 24 and/or LCD display 22. Data may also be written to half-frame buffer 76, which buffers half of the screen when a dual-scan LCD screen is used.

Pixel data is transferred from CRT buffer 58 to attribute controller 61 using the pixel clock. Attribute controller 61 may re-map or alter the color represented by the pixel data by using a color look-up table. Other attributes, such as blinking or reverse-video characters may be applied by attribute controller 61.

Using the pixel clock, RAMDAC 60 receives the modified pixel data from attribute controller 61. RAMDAC 60 contains a RAM that is indexed by the pixel data, and outputs digital values for red, green, and blue sub-pixels that comprise a color pixel. RAMDAC 60 also contains a digital-to-analog converter (DAC) that converts the digital color sub-pixels to analog intensity values that are transmitted to the external CRT 24. The analog output to CRT 24 is generated by timing the transfer of the analog pixel intensity data outputted.

Digital pixel data from RAMDAC 60 is clocked to Gray-scale controller 78. The digital pixel data is taken from RAMDAC 60 after the RAM has been accessed and has output the digital sub-pixels, but before conversion to analog values. Gray-scale controller 78 may perform a gray-scale conversion of the color sub-pixels if LCD display 22 is monochrome or color, or may perform some other conversion of the pixel data to a format accepted by LCD display 22. The converted pixel data from Gray-scale controller 78 is clocked into the LCD display 22. LCD display 22 may itself include some additional control or conversion logic to manipulate the pixel data before its is visually displayed on a screen, and it may be of many different types or technologies. When the LCD screen is of the dual-panel type, pixel data is also supplied by an indirect path from half-frame buffer 76.

ALTERNATE EMBODIMENTS

Several other embodiments are contemplated by the inventor. For example, the various blocks of the video sub-system may be integrated onto one or more silicon substrates, depending upon the technology used. The invention has been described in terms of a combined CRT and LCD controller, but the invention could apply to desktop computers with only CRT that could also drive a LCD. The horizontal line clock is free-running while the display is being generated, but could of course be halted when the display is suspended.

The preferred embodiment used the PCI bus, but other host busses such as VESA, EISA, or ISA (AT) may be used. Many implementations of the logic disclosed herein is possible. For instance, a clock gating circuit has been shown using a positive-logic AND gate, but a positive-logic OR gate could be used with the enable signal being inverted. Inverting logic using NAND or NOR gates could likewise be used, and many combinations of more complex logic is possible. The video memory is preferably constructed of dynamic RAM chips, but more expensive Video RAM (VRAM) chips or other types of memory chips may be used.

Additionally, each of the clocks may be enabled in a staggered or pipelined fashion, when the pixel data is being transferred through the particular logic blocks controlled by that clock. For example, the pixel clock for the LCD panel may be enabled a few clock cycles after the pixel clock to the CRT is enabled, and may be disabled a few clock cycles after, to account for the pipeline delays of the data in reaching the LCD controller from the CRT buffer.

While a multiplexer has been described for merging the standard horizontal line clock with the burst of pulses, persons skilled in the art will recognize that merging may be accomplished without a multiplexer. The horizontal line clock generator may increase its frequency when the burst is to be generated without multiplexing two separately-generated clock signals. Other embodiments are possible for generating clock having a burst which still add additional pulses during the retrace period, eliminating DC buildup.

The number of horizontal line clocks that occur during the vertical re-trace period varies for different CRT monitors and configurations and is typically 26 to 30 for SVGA. Panel assemblies may use more complex schemes to alter the polarity than a simple line counter, but these complex schemes can be approximated as a simple counter. The invention is successful with complex polarity-inverting schemes because the optimum number of pulses in the burst is determined empirically. Thus the actual circuitry inside the panel assembly need not be known. The panel assembly may be either gray-scale or color and use a variety of technologies such as thin-film transistors as well as passive liquid crystal films.

The burst of line-clock pulses has been described as occurring after a standard horizontal line-clock pulse. However, the burst of pulses could be equally spaced throughout one standard horizontal clock period during vertical re-trace or even spread out over many horizontal line-clock periods during the vertical re-trace.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A graphics controller for driving a stream of pixels representing a frame of an image to a flat-panel display and simultaneously driving the stream of pixels to a cathode-ray tube (CRT), the graphics controller comprising:

line clock means for generating a free-running horizontal clock having a frequency equal to a horizontal synch frequency applied to the CRT for synchronizing horizontal lines of pixels;

vertical re-trace means, triggered after all horizontal lines of pixels are driven to the flat-panel display, for generating a vertical re-trace signal to the CRT to prevent pixels from being visibly displayed on the CRT during a re-trace period;

burst means, triggered during the re-trace period, for generating a burst of pulses; and merge means, coupled to the burst means and coupled to the free-running horizontal clock, for applying the free-running horizontal clock to a line-clock input on the flat-panel display and also applying the burst of pulses to the line-clock input on the flat-panel display;

whereby the burst of pulses is applied to the line-clock input of the flat-panel display during the re-trace period of the CRT.

2. The graphics controller of claim 1 further comprising:

programmable means, coupled to the burst means, for adjusting a number of pulses in the burst of pulses in response to programming by a user, whereby the number of pulses in the burst of pulses applied to the line-clock input of the flat-panel display is programmable.

3. The graphics controller of claim 2 wherein the burst of pulses have a frequency greater than the horizontal synch frequency.

4. The graphics controller of claim 3 wherein the number of pulses is less than 30.

5. The graphics controller of claim 1 further comprising:

pixel clock means for generating a pixel clock, wherein one pixel is transferred to the CRT and transferred to the flat-panel display during each pixel-clock period of the pixel clock when the vertical re-trace signal is not active;

wherein the line clock means includes means for receiving the pixel clock and means for generating a pulse of the free-running horizontal clock after every x pixel-clock periods, wherein x is a number of pixels in a horizontal line for a current resolution being displayed, whereby the free-running horizontal clock is generated from the pixel clock.

6. The graphics controller of claim 5 wherein the burst means further comprises:

trigger means for beginning the burst of pulses during the re-trace period in response to a pulse of the free-running horizontal clock during the re-trace period;

a burst counter, receiving the pixel clock, for counting a number of pulses generated;

terminating means for ending the burst of pulses after the number of pulses generated equals a programmed number of pulses.

7. The graphics controller of claim 6 further comprising:

programmable-spacing means, coupled to the pixel clock, for determining a number of pixel-clock periods between pulses in the burst of pulses, the number of pixel-clock periods being programmed by a user, whereby the burst of pulses is generated with a period programmed by the user.

8. The graphics controller of claim 7 wherein the re-trace period is at least 20 times a period of the free-running horizontal clock.

9. The graphics controller of claim 1 further comprising the flat-panel display which comprises:

a panel assembly containing a polarity-inverting counter for inverting a polarity of voltages applied to a matrix of picture elements in the panel assembly, the polarity-inverting counter inverting the polarity after every m pulses of the line-clock input, wherein m is a positive integer;

wherein the burst of pulses applied to the line-clock input advance the polarity-inverting counter, whereby D.C. buildup in the matrix is reduced by the burst of pulses which advance the polarity-inverting counter before a next frame is displayed.

10. A method of reducing charge buildup and flicker in a flat-panel display comprising the steps of:

programming a burst-count into a programmable register;

generating a pixel clock pulse for each pixel transferred to a flat-panel display;

simultaneously transferring pixels to both the flat-panel display and to a CRT display in response to the pixel clock;

pulsing a line clock after a complete horizontal line of pixels has been transferred wherein the line clock has a horizontal frequency;

continuing to transfer horizontal lines of pixels and pulsing the line clock after each horizontal line until all horizontal lines of pixels in a frame have been transferred;

beginning a vertical re-trace period after all horizontal lines of pixels in the frame have been transferred;

re-tracing an electron beam in the CRT display to a beginning of a first horizontal line during the vertical re-trace period;

continuing to pulse the line clock at the horizontal frequency during the vertical re-trace period and applying the line clock to the CRT display and to the flat-panel display; and generating a high-frequency burst of line-clock pulses and applying the high-frequency burst of line-clock pulses to the flat-panel display but not to the CRT display during the vertical re-trace period, the high-frequency burst of line pulses having the burst-count number of pulses programmed into the programmable register, whereby the burst-count number of line-clock pulses is applied to the flat-panel display during the vertical re-trace period.

11. The method of claim 10 further comprising the steps of:

observing an amount and intensity of flicker on the flat-panel display;

adjusting the burst-count in the programmable register and repeating the method of claim 10 and observing the amount and intensity of flicker on the flat-panel display when the adjusted burst-count is programmed;

choosing an optimal burst-count which minimized the amount and intensity of flicker in the flat-panel display; and programming the optimal burst-count into the programmable register for production units, whereby flicker in production units is reduced by adjusting the burst-count.

12. The method of claim 10 further comprising the steps of:

incrementing a line counter in a panel assembly which contains the flat-panel display when a line-clock pulse is received; and reversing polarity of voltages applied to a display matrix when the line counter reaches a terminal count equal to the modulus of the line counter, whereby the high-frequency burst of line-clock pulses increments the line counter in the panel assembly.

13. A video display subsystem for a portable computer having a flat-panel display assembly and a connector for driving an external cathode-ray-tube (CRT) monitor, the video display subsystem comprising:

a clock generator for generating
- a pixel clock for timing transfers of individual pixels to the flat-panel display assembly and to the external CRT monitor;
- a line clock generated by the clock generator dividing the pixel clock by a number of pixels in a horizontal line;
- a vertical clock generated by the clock generator further dividing the line clock by a number of CRT lines, the number of CRT lines being equal to a number of horizontal lines displayed by the external CRT monitor added to a number of lines required for vertical re-trace of the external CRT monitor;

the connector for driving the line clock and the vertical clock to the external CRT monitor along with a stream of pixels synchronized to the pixel clock;

a burst generator for generating a burst of pulses during the vertical re-trace of the external CRT monitor; and the flat-panel display assembly including means for receiving the line clock and the stream of pixels synchronized to the pixel clock, the flat-panel display assembly also including means for receiving the burst of pulses generated by the burst generator during the vertical re-trace of the external CRT monitor, whereby the flat-panel display assembly receives the line clock and the burst of pulses during the vertical re-trace of the external CRT monitor.

14. The video display subsystem of claim 13 further comprising:

a programmable register containing a burst value;

wherein the burst generator generates a number of pulses in the burst of pulses related to the burst value, whereby the number of pulses in the burst of pulses is varied by the programmable register.

15. The video display subsystem of claim 14 wherein the burst of pulses are generated from the pixel clock, the burst of pulses having a frequency higher than a frequency of the line clock.

16. The video display subsystem of claim 15 wherein the flat-panel display assembly comprises:

a matrix of rows and columns of picture elements forming a visible display;

high-voltage means for applying a high voltage to the matrix, the high voltage being greater than a maximum voltage of the pixel clock;

polarity-inverting means for periodically inverting a polarity of the high voltage applied to the matrix, the polarity-inverting means inverting the polarity in response to a predetermined number of pulses of the line clock or burst of pulses.

17. The video display subsystem of claim 16 wherein the predetermined number of pulses varies for different manufacturers of the flat-panel display assembly.

18. The video display subsystem of claim 16 wherein the matrix of rows and columns comprise a dual-scan passive flat-panel display, the video display subsystem further comprising a half-frame buffer for buffering half of the pixels displayed in a display frame, the matrix activating two rows of pixels simultaneously, with one of the rows receiving pixels from the half-frame buffer.

19. The video display subsystem of claim 13 wherein the burst of pulses have a frequency greater than a horizontal synch frequency of the line clock.

* * * * *